US012646927B2

(12) United States Patent
Lecerf et al.

(10) Patent No.: US 12,646,927 B2
(45) Date of Patent:     Jun. 2, 2026

(54) DEVICE AND METHOD FOR PROTECTING AN ELECTRONIC EQUIPMENT ITEM

(71) Applicant: THALES, Meudon (FR)

(72) Inventors: Florent Lecerf, Etrelles (FR);
Sébastien Guillou, Etrelles (FR);
Richard Morisse, Etrelles (FR); **Eric
Muller**, Nantes (FR)

(73) Assignee: THALES, Meudon (FR)

( * ) Notice: Subject to any disclaimer, the term of this
patent is extended or adjusted under 35
U.S.C. 154(b) by 177 days.

(21) Appl. No.: 18/292,333

(22) PCT Filed: Aug. 4, 2022

(86) PCT No.: PCT/EP2022/071959
§ 371 (c)(1),
(2) Date: Jan. 25, 2024

(87) PCT Pub. No.: WO2023/012279
PCT Pub. Date: Feb. 9, 2023

(65) Prior Publication Data
US 2024/0348045 A1      Oct. 17, 2024

(30) Foreign Application Priority Data

Aug. 4, 2021    (FR) ...................................... 2108477

(51) Int. Cl.
H02H 9/02          (2006.01)
B64D 47/00        (2006.01)
(52) U.S. Cl.
CPC .............. H02H 9/02 (2013.01); B64D 47/00
(2013.01)

(58) Field of Classification Search
CPC ............ H02H 9/02; H02H 3/20; H02H 3/025;
H02H 9/025; H02H 9/001; B64D 47/00
(Continued)

(56) References Cited

U.S. PATENT DOCUMENTS 5,463,252 A * 10/1995 Jones ...................... H01L 25/18
257/723
11,171,481 B1* 11/2021 Hudson ................. B60R 16/033
(Continued)

FOREIGN PATENT DOCUMENTS

EP            2945241 A1     11/2015

OTHER PUBLICATIONS

FR 2108477, INPI Rapport de Recherche Preliminaire, Mar. 14,
2022, 2 pages.
(Continued)

*Primary Examiner* — Danny Nguyen
(74) *Attorney, Agent, or Firm* — Soquel Group LLC

(57)          ABSTRACT
A device for protecting an electronic equipment item, con-
figured to limit the electric current between an electric
power generator and an electronic equipment item consum-
ing electric power. The device includes a control circuit
connected to a power circuit, the power circuit including
power semiconductors, the power circuit being able to be
connected in series between the electric power generator and
the electronic equipment item. The control circuit includes
event detection modules, a current setpoint variation mod-
ule, and a control module for controlling the power semi-
conductors, configured to supply a control signal for limiting
the electric current in the power circuit as a function of the
current limitation setpoint signal.

10 Claims, 7 Drawing Sheets

(58) Field of Classification Search
USPC .................................... 361/86–87, 93.7–93.9
See application file for complete search history.

(56) References Cited

U.S. PATENT DOCUMENTS

| | | | | |
|---|---|---|---|---|
| 2009/0002901 A1* | 1/2009 | Matsumoto | ............ | H03K 17/30 |
| | | | | 361/18 |
| 2016/0064919 A1* | 3/2016 | Oka | ........................ | H02H 3/207 |
| | | | | 361/91.1 |
| 2016/0105018 A1* | 4/2016 | Wang | ..................... | H01H 9/541 |
| | | | | 361/93.9 |
| 2020/0036375 A1 | 1/2020 | Suh et al. | | |
| 2020/0339051 A1* | 10/2020 | Schill | .................. | H01M 10/425 |
| 2020/0373754 A1 | 11/2020 | Tournier et al. | | |

OTHER PUBLICATIONS

International Search Report, PCT/EP2022/071959, Nov. 22, 2022, 2 pages.

\* cited by examiner

DEVICE AND METHOD FOR PROTECTING AN ELECTRONIC EQUIPMENT ITEM

CROSS-REFERENCE TO RELATED APPLICATIONS

This application claims benefit under 35 USC § 371 of PCT Application No. PCT/EP2022/071959 entitled DEVICE AND METHOD FOR PROTECTING AN ELECTRONIC EQUIPMENT ITEM, filed on Aug. 4, 2022 by inventors Florent Lecerf, Sébastien Guillou, Richard Morisse and Eric Muller. PCT Application No. PCT/EP2022/071959 claims priority of French Patent Application No. 21 08477, filed on Aug. 4, 2021.

FIELD OF THE INVENTION

The present invention relates to a device for protecting an electronic equipment item, configured to provide electric current limitation between an electric power generator and at least one electronic equipment item consuming electric power, as well as to an associated method for protecting an electronic equipment item.

The invention is within the domain of protecting an electronic equipment item, and more particularly in the field of protection of onboard electronic equipment item in aircraft.

BACKGROUND OF THE INVENTION

More specifically, in the domain of aeronautics, an important issue is the protection of onboard electronic equipment item against the indirect effects of lightning.

In the domain of aeronautics, it is known to equip an aircraft, with a composite structure, with an electrical structure network (ESN) to provide protection against overvoltages, particularly those generated by lightning, consisting of external metallization of the aircraft and integration of a ground plane close to the wiring of onboard electronic equipment item. Such an installation makes the aircraft heavier, and therefore penalizes flight performance.

In addition, there are composite aircraft without ESN, and the integration of such external surface metallization is not feasible. In this case, the use of standard electronic equipment item is not possible, and it is then necessary to design new internal protections able to withstand high power for the electronic equipment item, and to modify the associated connections, which is on the one hand costly, and on the other hand can also lead to increases in volume and mass.

In the domain of electric circuit protection, the use of static circuit-breaking components (or circuit-breakers) is known, which open a circuit in the case where overcurrent or overvoltage is detected. In particular, combinations of fuses and semiconductor components, in parallel or in series, are known. However, the protection must be replaced after tripping, which increases the number of maintenance operations.

SUMMARY OF THE DESCRIPTION

The invention has as its object, to propose a solution for protecting electronic equipment item, particularly onboard an aircraft, which remedies the disadvantages of the state of the art.

To this end, the invention proposes a device for protecting an electronic equipment item configured to limit the electric current between an electric power generator and an electronic equipment item consuming electric power. This device includes a control circuit connected to a power circuit, said power circuit including power semiconductors, said power circuit being able to be connected in series between the electric power generator and said electronic equipment item. The control circuit includes:

a first event detection module relating to a start-up of the protection device and/or the supplied electronic equipment item, a second overvoltage generating event detection module, configured to detect a voltage greater than an overvoltage threshold at the power circuit terminals, a current setpoint variation module, connected to the output of said first (50) and second (60) detection modules and configured to adapt a current limitation setpoint signal as a function of a detected event, a power semiconductor control module, configured to supply a control signal for controlling the semiconductors of the power circuit allowing to limit the electric current in the power circuit as a function of the current limitation setpoint signal.

Advantageously, the proposed protection device is particularly able to protect electronic equipment item onboard an aircraft, and compatible with standard electronic equipment item.

The protection device according to the invention may also present one or more of the following features, taken independently or in any technically conceivable combination.

The power semiconductors are silicon carbide semiconductors.

The power circuit includes a first block of power semiconductor transistors and a second block of power semiconductor transistors, each block of power semiconductor transistors including at least one transistor, and one current sensor connected between said first block of power semiconductor transistors and said second block of power semiconductor transistors, said blocks of transistors forming a bidirectional analog switch.

The control circuit further includes a current measurement conditioning module, configured to amplify and rectify a voltage, image of the current, at the terminals of the current sensor.

The current measurement conditioning module includes a full-wave non-threshold rectifier.

The power semiconductor control module receives as input said rectified current image and a current limitation setpoint signal supplied by the current setpoint variation module, and supplies as output said control signal.

The current setpoint variation module includes a voltage divider bridge, having a gain adjusted as a function of the outputs of said first event detection module and the second event detection module.

The first event detection module includes a start-up phase management unit configured to limit the current to zero amperes during a first delay time period, and an electronic equipment item current draw management unit, configured to limit the current to a predetermined value during a second delay time period.

According to another aspect, the invention relates to a method for protecting electronic equipment item implemented by a protection device such as briefly described above. This method includes:

detection of an event relating to the protection device being started and limiting the current to zero amperes during a first delay time period;

detection of an event relating to a start-up of the powered electronic equipment item and limiting the current to a predetermined value during a second delay time period; detection of an overvoltage generator event and limiting the current to a predetermined maximum current value.

According to another aspect, the invention relates to an onboard electronic system including an electric power generator and at least one electronic equipment item powered by said generator, including a protection device such as briefly described above connected between the electric power generator and the electronic equipment item.

BRIEF DESCRIPTION OF THE DRAWINGS

Further features and advantages of the invention will become apparent from the description given below, by way of indication and by no means limiting, with reference to the appended figures, among which.

DETAILED DESCRIPTION OF EMBODIMENTS

Figure 1:
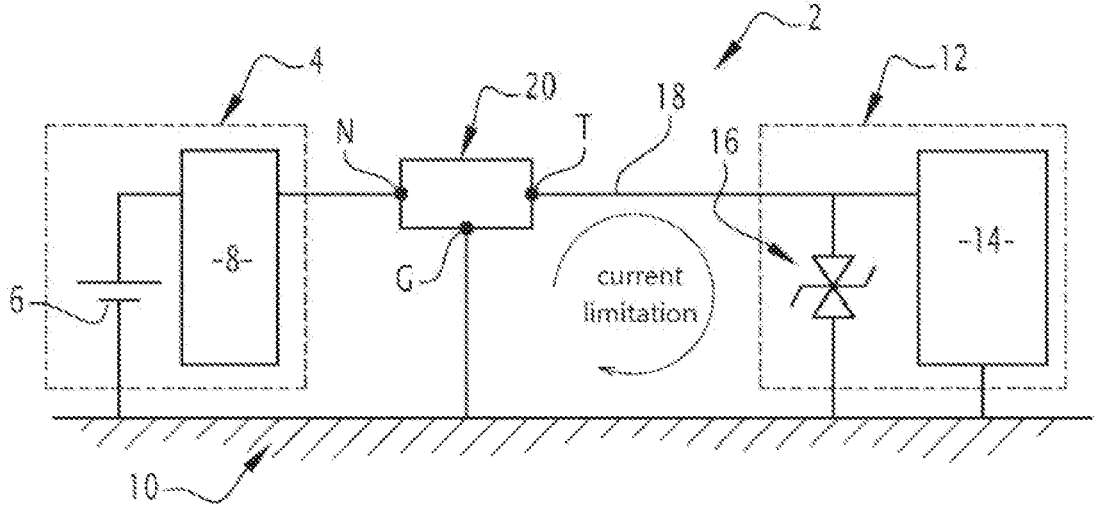
FIG. 1 illustrates one embodiment of an electronic system incorporating a protection device according to the invention.

FIG. 1 schematically illustrates an electronic system 2, for example onboard an aircraft (not shown).

The electronic system 2 includes an electric power generator module 4, which includes a generator 6 and an internal protection unit 8. The generator 6 is connected on one hand, to the ground 10 (reference at 0V), shown schematically in FIG. 1, and on the other hand, to the internal protection unit 8. The internal protection unit 8 is of a known type, for example an electromechanical or static circuit breaker.

The electric power generator module 4 is able to supply electricity to an electronic equipment item 12, which is located downstream of the generator module 4. The electronic equipment item 12 comprises an internal power supply 14, connected in parallel to a low-power TVS (transient voltage suppression) protection component 16. The TVS component 16 clips the voltage on the power distribution line 18 at the input to the electronic equipment item 12. The low-power TVS components are already integrated into the standard electronic equipment item onboard the metal-structured aircraft (less sensitive to the indirect effects of lightning than composite-structured aircraft). The TVS power level depends on the intended use of the equipment.

It is proposed to connect between the electric power generator module 4 and the electronic equipment item 12 a protection device 20, described in detail below, which realizes a limitation of the electric current, the limitation being adapted as a function of detected events, and in particular as a function of the detection of events generating overvoltage or overcurrent. In particular, the protection device 20 allows the current to be limited in the event of an isolated or occasional overvoltage, for example due to lightning.

Advantageously, the protection device 20 realizes an active bidirectional current-limiting function, that is, it allows overvoltage or overcurrent of positive or negative polarity to be handled, arriving on the electric power generator module 4 side or on the electronic equipment item 12 side.

Furthermore, advantageously, the protection device 20 can be placed anywhere between the electric power generator module 4 and the electronic equipment item 12.

In the embodiment shown schematically in FIG. 1, the protection device 20 is placed on the electricity distribution line 18, between the generator module 4 and the electronic equipment item 12.

According to alternatives, not shown, the protection device 20 can be integrated in the electric power generator module 4, at the output of the internal protection unit 8, or in the electronic equipment item 12.

According to another alternative, not shown, the protection device 20 is placed on the electricity distribution line 18, between the generator module 4 and a plurality of electronic equipment item to be protected.

Figure 2:
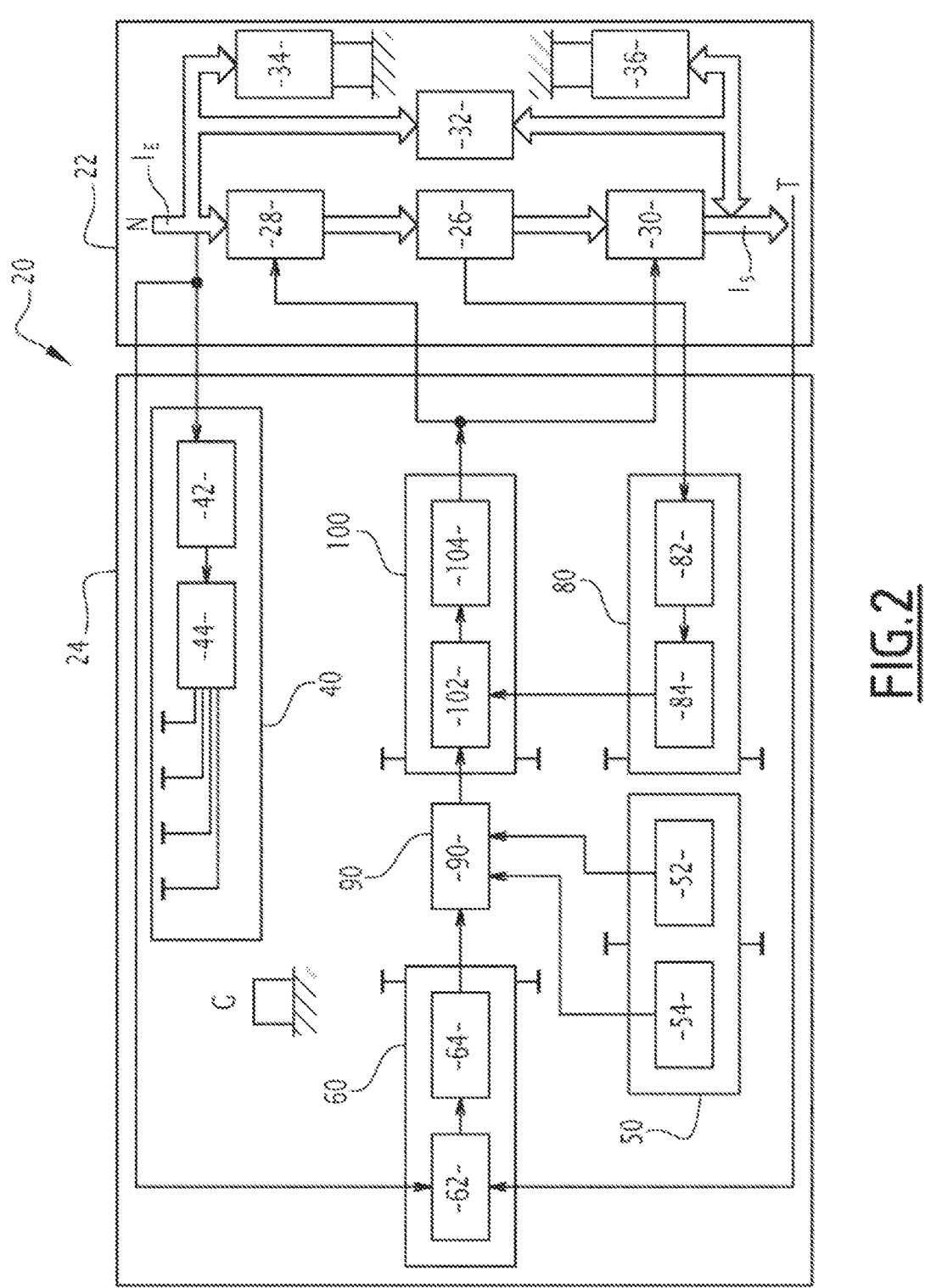
FIG. 2 illustrates one embodiment of a protection device according to the invention.

One embodiment of a protection device 20 is described below with reference to FIG. 2.

The protection device 20 includes a power circuit 22 and a control circuit 24.

Advantageously, in one embodiment, the power circuit 22 is realized on a substrate or power board, and the control circuit 24 is realized in the form of a PCB (printed circuit board) called a control board.

For example, in one embodiment, the two boards are positioned in an assembled module, the control board being positioned on a mezzanine level relative to the power board, which is assembled in the lower part, on a base plate, to favor heat exchange.

Advantageously, such an assembled module is compact, for example 61 mm×61 mm in size.

For example, the power board is made using an AMB (Active Metal Brazing) substrate and a $Si_3N_4$ (silicon nitride) ceramic.

For example, the PCB control board is made by alternately stacking layers of FR4 (glass-fiber-reinforced epoxy resin composite) and layers of copper.

The power circuit 22 comprises an input N connected to the distribution line 18 on the power generator module 4 side, and an output T connected to the distribution line 18 on the electronic equipment item 12 side.

Input N and output T are respectively associated with a first connection terminal and a second connection terminal of the protection device 20, for example materialized by busbars.

In one embodiment, the protection device 20 further includes a third connection terminal G, for connection to ground (reference voltage terminal).

The power circuit 22 comprises a current sensor 26, connected between two blocks of power semiconductor transistors 28, 30, respectively a first power semiconductor block 28 connected between the input N and the current sensor 26, and a second power semiconductor block 30 connected between the current sensor 26 and the output T.

Each power semiconductor block includes one or more power semiconductors connected according to a connection diagram described below.

In addition, the power circuit 22 comprises a TVS (transient voltage suppression) type overvoltage protection unit 32, and two filter units, respectively a first filter unit 34 at the input, and a second filter unit 36 at the output, each filter unit carrying out LC filtering allowing to dampen oscillations caused by parasitic wiring elements of the electricity distribution line 18.

Figure 3:
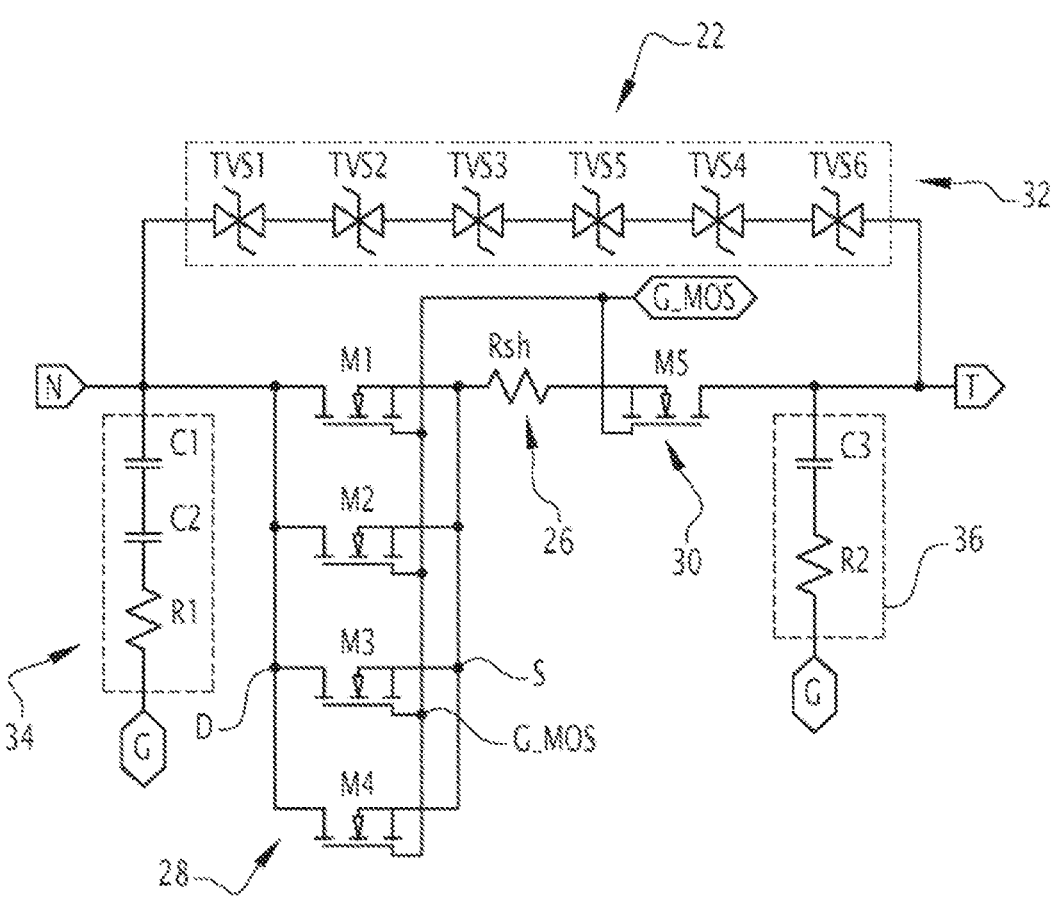
FIG. 3 illustrates one embodiment of a power module.

FIG. 3 shows a detailed embodiment of a power circuit 22, including five power semiconductor transistors M1, M2, M3, M4 and M5, forming a bi-directional analog switch.

Preferably, the transistors M1, M2, M3, M4, M5 are MOSFET field-effect transistors, and more particularly silicon carbide (SIC) MOSFET transistors.

The first power semiconductor block 28 comprises transistors M1 to M4, while the second power semiconductor block 30 comprises transistor M5.

The current sensor 26 is provided by a resistor Rsh.

The first filter unit 34 comprises a resistor R1 and two capacitors C1, C2 connected in series.

The second filter unit 36 comprises a resistor R2 and a capacitor C3 connected in series.

The TVS overvoltage protection unit 32 comprises six TVS components connected in series.

More generally, such a TVS overvoltage protection unit includes a number Q of TVS components in series, the number Q varying between, for example, 2 and 10.

The number Q is, in particular, chosen as a function of the power of the electronic equipment item to be protected. The higher the number Q, the less energy is sent toward the equipment to be protected, but of course, the larger the footprint. The proposed six-component embodiment allows a good balance between protection and size to be obtained.

The respective transistors M1 to M5 are controlled by the control circuit 24, by a control signal on their respective gates, noted G_MOS, as explained in more detail below.

The control circuit 24 comprises an internal power supply unit 40, connected to the electricity distribution line 18, allowing the protection device 20 to be self-powered from the protected distribution line.

The internal power supply unit 40 includes an internal protection unit 42 and a converter 44. The internal protection unit 42 comprises, for example, an anti-return diode, a clipper allowing the power supply 40 to be protected from transients, a bidirectional current limiter and a TVS component.

The converter 44 is, for example, of the "Flyback" type, allowing useful supply voltages to be generated for the internal modules, represented schematically by 4 branches of the converter 44, for example supply voltages of +5V, −5V floating, +5V floating and +15V floating.

Floating voltage means a voltage that is not referenced to 0V ground. These floating voltages are used to drive power semiconductors.

The converter 44 incorporates an energy reserve, for example in the form of a capacitor bank located at the flyback power supply input. The control circuit 24 also comprises:

a first event detection module 50, configured to detect an event relating to the start-up of the protection device or the downstream electronic equipment item,
  a second event detection module 60, configured to detect an overvoltage generating event (for example, lightning detection).
  a current measurement conditioning module 80,
  a current setpoint variation module 90, and
  a module 100 for controlling the power semiconductors of the power circuit 22.

The first event detection module 50 respectively includes a unit 52 for managing a start-up phase (for example, starting the protection device 20) and a unit 54 for managing a current draw, for example when the downstream electronic equipment item 12 is started.

The unit 52 for managing a start-up phase is configured to limit the current to 0 amperes during a first delay time $T_m$ (or in other words, to exercise a switch function during $T_m$). Advantageously, this allows the internal power supplies of the protective device 20 to be established before the device is started.

The inrush current management unit 54 allows to limit the current to a predetermined value $I_{INRUSH}$ during a second predetermined delay time $T_{INRUSH}$. For example, $T_m$=10 ms, $T_{inrush}$=5 ms.

The second event detection module 60 includes a unit 62 for measuring the voltages at the terminals of the protection device 20, respectively a voltage $U_{NG}$ between the input terminal and ground and an output voltage $U_{TG}$ between the output terminal and ground.

The second event detection module 60 further includes a unit 64 configured to limit the current to a maximum current value $I_F$ if either of the measured voltages exceeds a predetermined overvoltage threshold, respectively a maximum and a minimum threshold, for example of the order of +70V/−70V on a 28 VDC network. These thresholds may vary as a function of the voltage of the network to be protected.

Figure 4:
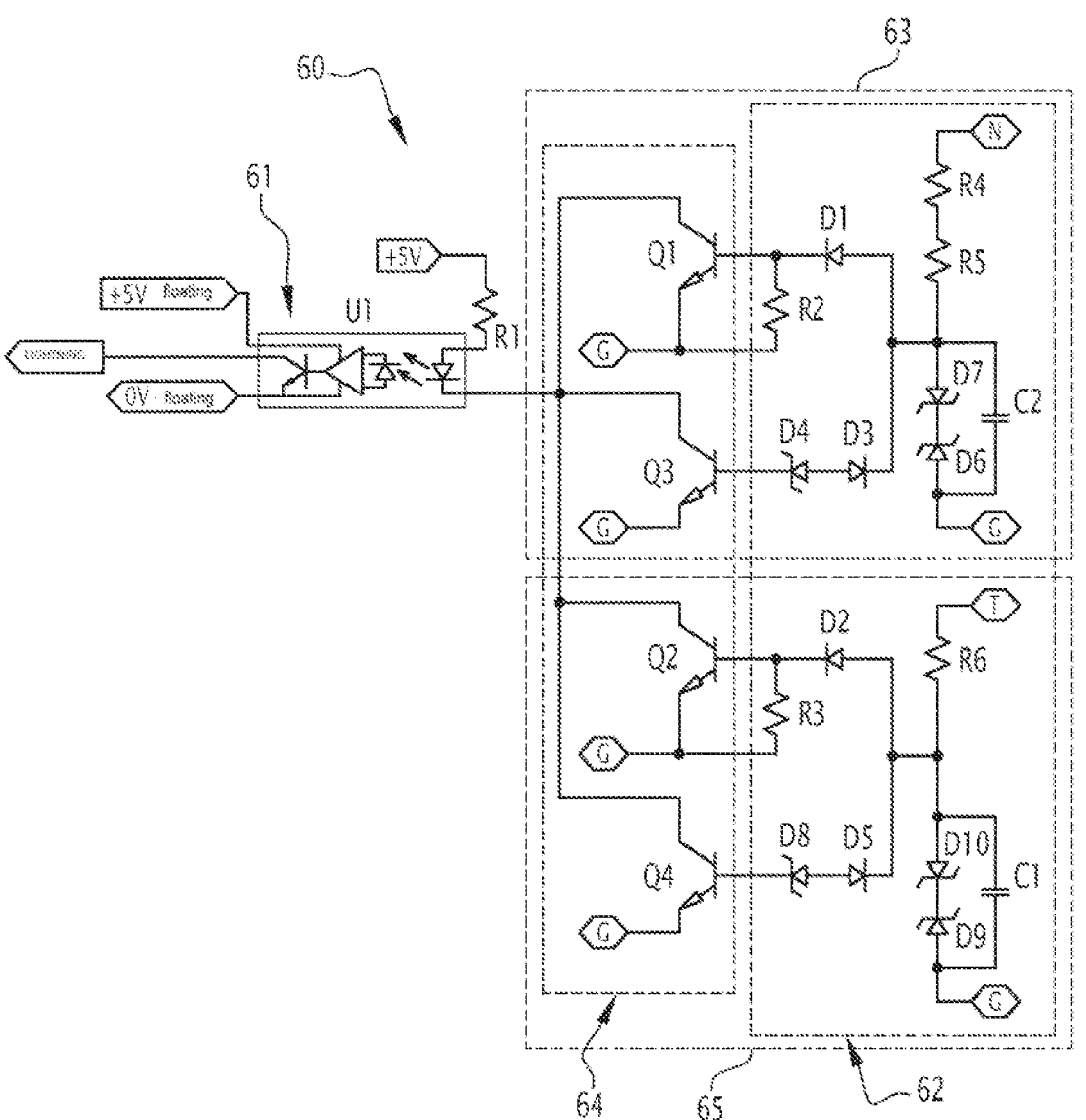
FIG. 4 illustrates one embodiment of an overvoltage event detection module.

FIG. 4 shows an example of the circuit used to implement the second event detection module 60.

The circuit shown in FIG. 4 includes an opto-coupler 61 connected in parallel to two sub-circuits 63, 65, the first sub-circuit 63 being connected to the input N and the second sub-circuit 65 being connected to the output T of the power circuit.

The sub-circuits 63, 65 in FIG. 4 are used to detect the presence of lightning, or more generally, of an overvoltage.

Each sub-circuit 63, 65 comprises a part that carries out a measurement of the voltage, corresponding to implementation of the unit 62, respectively of the voltage at input N (circuit 63) and output T (circuit 65) of the protection device 20.

The transistors Q1, Q3 and Q2, Q4 carry out lightning detection and current limiting (operation of unit 64), the transistors changing state when the measured voltage exceeds the maximum threshold (or is below the minimum threshold) described above, resulting in a change of state of the opto-coupler. The opto-coupler 61 is used to ensure a signal transmission between the lightning detection circuit 60 (referenced to 0V ground) and the current setpoint variation module 90, which controls the power semiconductor control module 100 (referenced to floating ground), ensuring galvanic isolation between these two circuits.

The conditioning module 80 is responsible for amplifying and rectifying the voltage, image of the current, at the terminals of the current sensor 26.

This module 80 comprises, in one embodiment, a measuring amplifier 82 and a rectifier unit 84, the rectified signal obtained being transmitted to the input of the power semiconductor control module 100.

In one embodiment, the measuring amplifier 82 is made up of two sub-stages, a differential amplifier and a non-inverting amplifier, in order to maintain a bandwidth able to trigger a sufficiently rapid protection, for example a bandwidth of the order of 1 to 5 MHz.

The 84 unit is made, for example, in the form of a full-wave non-threshold rectifier, in order to obtain a rectified signal (or absolute value of the signal), image of the rectified current, which is independent of polarity. Thus, a bi-directional protection is advantageously achieved, independently of the polarity of the measured current.

The current setpoint variation module 90 is configured to adapt a current limitation setpoint signal as a function of the events detected by the event detection modules 50 and 60. In one embodiment, the module 90 supplies at output a current limitation setpoint signal which has a voltage set by a voltage divider bridge the gain of which is adjusted as a function of detected events.

Figure 5:
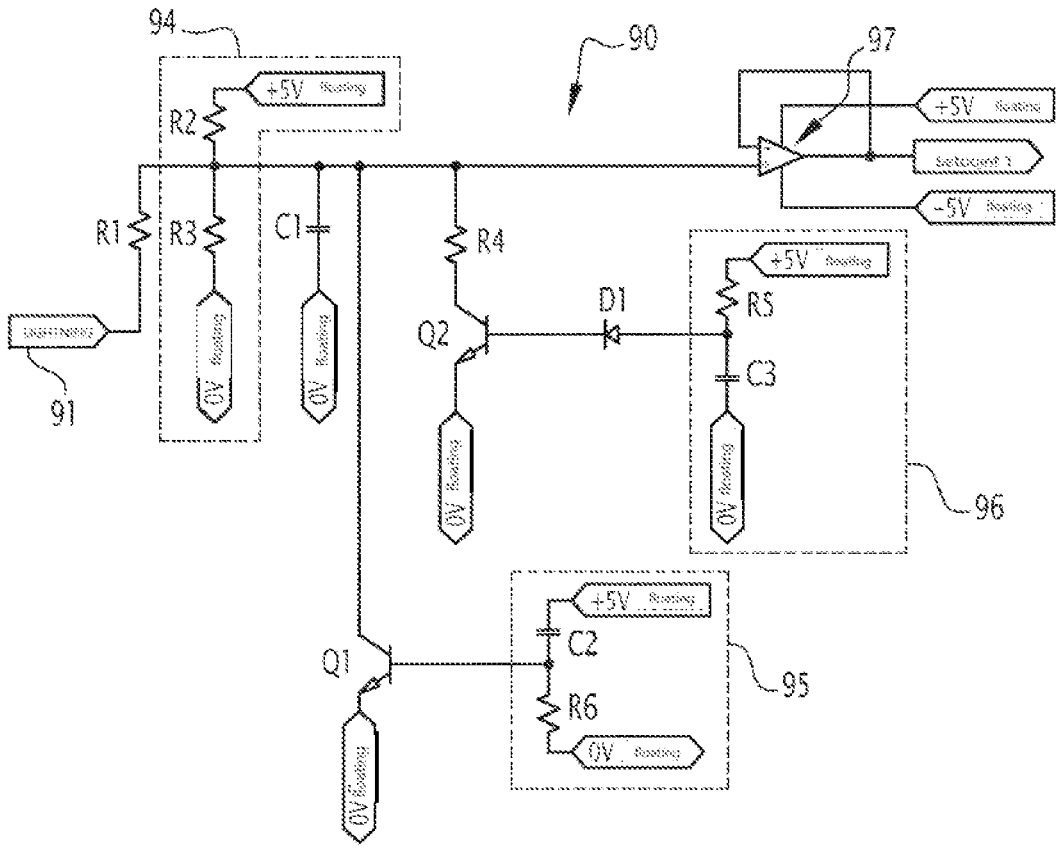
FIG. 5 illustrates one embodiment of a current setpoint variation module.

FIG. 5 illustrates a circuit allowing the current setpoint variation module 90 to be made in one embodiment.

The module 90 includes, in this embodiment, an input 91 from the second detection module 60. The value of the current limitation setpoint signal is set by means of a voltage divider bridge, as described below. The module 50 allows the value of this signal to be adapted by varying the gain of the voltage divider bridge.

The module 90 includes a voltage divider bridge 94, a first RC circuit 95 allowing the first delay time (start-up phase) to be set, including a capacitor C2 and a resistor R6 respectively, and a second RC circuit 96, allowing the second delay time for starting the supplied electronic equipment item to be set, including a capacitor C3 and a resistor R5 respectively.

The respective components C2, R6 and C3, R5 allow the first delay time $T_m$ and second delay time $T_{INRUSH}$ to be set in relation to the events of the protection device being started and the current being drawn from the supplied electronic equipment item.

The time delay is achieved by charging an RC circuit, the duration of which can be set by modifying the time constant of the RC circuit.

When the voltage across the capacitor terminals exceeds the transistor switching threshold, a bipolar transistor (Q1 or Q2) switches, which modifies the gain of the voltage divider bridge, which sets the value of the current limitation setpoint signal.

The module 90 also includes a differential operational amplifier 97, which supplies as output the current limitation setpoint signal "Setpoint_I" which is transmitted as input of the power semiconductor control module 100 for controlling the power circuit 22.

The current limitation setpoint can vary between 0 and 5V depending on the events detected.

The power semiconductor control module 100 for controlling the power circuit 22 comprises a differential amplifier 102 and a current amplifier 104.

It receives as input the current limitation setpoint signal, supplied by the current setpoint variation module 90, and the rectified signal, image of the rectified current, supplied by the conditioning module 80, and generates the control signal for the power semiconductors of the power circuit 22. Thus, the current in power circuit 22 is limited to a level controlled by the current limitation setpoint signal.

Figure 6:
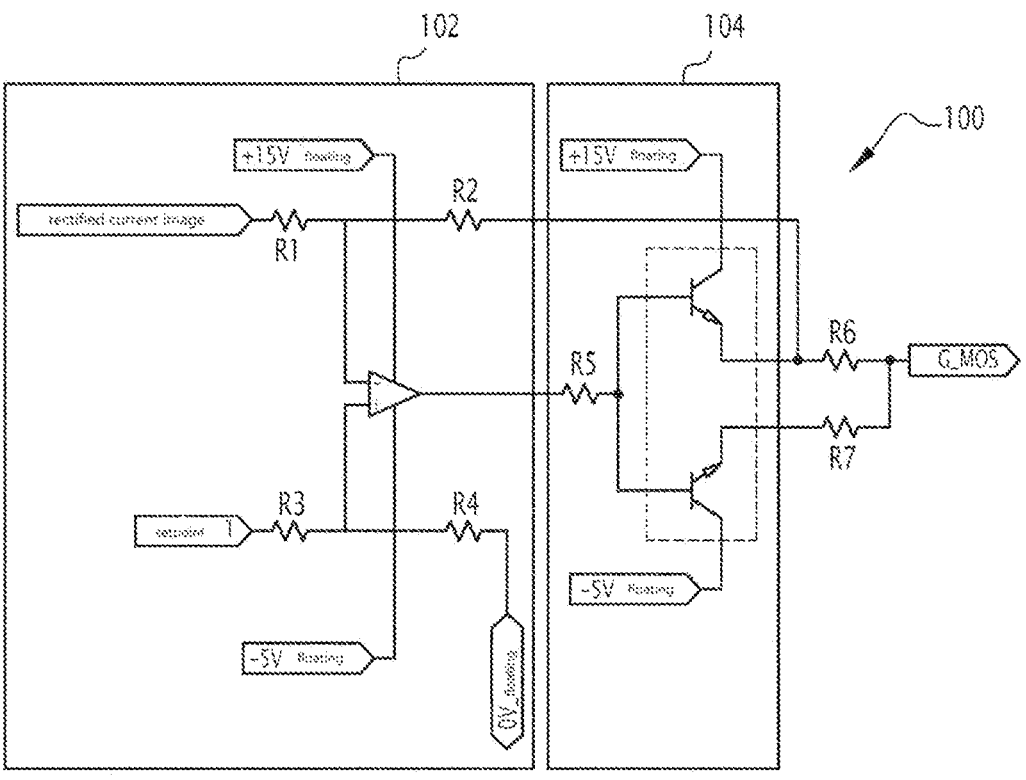
FIG. 6 illustrates one embodiment of a current measurement amplification module.

An example of the circuit allowing the semiconductor control module 100 to operate is shown in FIG. 6.

This circuit is constituted of a differential amplifier 102, which generates the semiconductor control signal voltage, and a current amplifier 104, which supplies the current necessary to control the semiconductors. The current amplifier can have a gain typically between 50 and 150. The differential amplifier can have a gain typically between 5 and 20.

Figure 7:
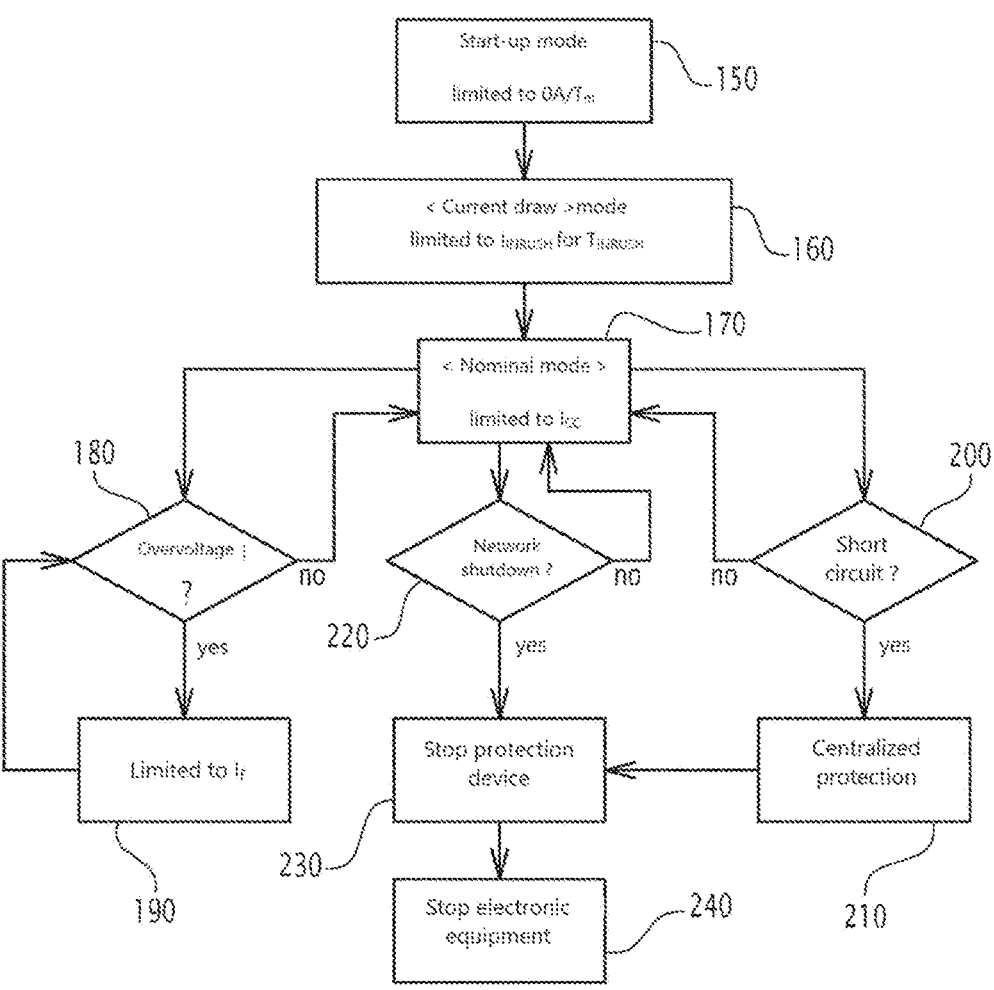
FIG. 7 is a synoptic of a method for protection implemented by a protection device according to one embodiment of the invention.

FIG. 7 is a block diagram of a protection method implemented by a protection device 20 according to one embodiment.

When the protection device is started, a start-up event is detected, and the corresponding operating mode or "start-up mode" is applied (step 150): the current limitation setpoint is 0A for the first delay time $T_m$.

The method also includes a step 160, implemented in the event of detection of a current draw event from the powered electronic equipment item, in which case the current limit setpoint is set to the predetermined value $I_{INRUSH}$ (and thus the current is limited to $I_{INRUSH}$) for the second delay time $T_{INRUSH}$ ("current draw" operating mode). For example, the predetermined $I_{INRUSH}$ current value is a maximum of 37.5 amperes for an equipment consuming a nominal 7.5A.

In nominal operating mode 170, that is, if none of the above-mentioned events has been detected, the current-limiting setpoint is set to $I_{CC}$, the nominal current value of the power semiconductor transistors in the power circuit 22.

Throughout the entire operating time of the protection device, several checks are effected, in particular to detect (step 180) an overvoltage generator event, that is, the presence of lightning, by checking for the presence of a voltage above the predetermined overvoltage threshold. The current limitation at a maximum current value $I_F$ is applied (step 190), for example of the order of 1 ampere, this value being related to the amount of energy dissipable by the power semiconductor technology used.

Furthermore, the protection device ensures permanent limitation of the current to a value $I_{oc}$, which allows permanent protection even in the presence of a short-circuit, pending short-circuit detection (step 200) and takeover by the internal protection device 8 of the power generator module (step 210).

In the event the internal protection device 8 is triggered, the protection device 20 is shut down (step 230), and the downstream electronic equipment item is shut down (step 240).

A check is also made (step 220) to see whether there has been an interruption in the power supply network for a third time greater than or equal to a predetermined interruption duration, for example of the order of 50 ms. In the event of a positive check in step 220, the protection device 20 is shut down (step 230), and the downstream electronic equipment item is shut down (step 240).

Advantageously, the proposed protection device is bidirectional, in other words it is able to limit the current, whatever the direction of the current flowing through it. In addition, the protection is advantageously based on active components (MOSFET power semiconductors, capable of increasing the power of a signal).

The invention claimed is:

1. A protection device for an electronic equipment item limiting an electric current between an electric power generator and an electronic equipment item that consumes electric power, comprising a control circuit connected to a power circuit, the power circuit comprising power semiconductors, the power circuit connected in series between the electric power generator and the electronic equipment item, the control circuit comprising:

a first event detection module relating to the start-up of the protection device and/or the electronic equipment item, comprising:

a start-up phase management unit limiting the electric current to zero amperes during a first delay time; and a current draw management unit for the electronic equipment item limiting the electric current to a predetermined value during a second delay time;

a second event detection module detecting an overvoltage generating event, detecting a voltage greater than an overvoltage threshold at the terminals of the power circuit;

a current setpoint variation module, connected to the output of said first and second detection modules and adapting a current limitation setpoint signal as a function of a detected event; and a power semiconductor control module supplying a control signal for controlling the semiconductors of the power circuit by limiting the electric current in the power circuit as a function of the current limitation setpoint signal.

2. The protection device according to claim 1, wherein the power semiconductors are silicon carbide semiconductors.

3. The protection device according to claim 1, wherein the power circuit comprises a first block of power semiconductor transistors and a second block of power semiconductor transistors, each block of power semiconductor transistors including at least two transistors, and a current sensor connected between the first block of power semiconductor transistors and the second block of power semiconductor transistors, each of the transistor blocks forming a bidirectional analog switch.

4. The protection device according to claim 3, wherein said control circuit further comprises a current measurement conditioning module amplifying and rectifying a voltage, image of the electric current, at the current sensor terminals.

5. The protection device according to claim 4, wherein said current measurement conditioning module comprises a full-wave non-threshold rectifier.

6. The protection device according to claim 5, wherein said power semiconductor control module receives as input the rectified current image and a current limitation setpoint signal supplied by said current setpoint variation module, and outputs the control signal.

7. The protection device according to claim 1, wherein said current setpoint variation module comprises a voltage divider bridge, having a gain adjusted as a function of the outputs of said first event detection module and said second event detection module.

8. A method for protecting electronic equipment item implemented by the protection device in accordance with claim 1, comprising:

detecting an event relating to the start-up of the protection device;

limiting an electric current between the electronic equipment item and an electric power generator to zero amperes during a first delay time period;

detecting an event relating to the start-up of the electronic equipment item;

limiting the current to a predetermined value for a second delay time period;

detecting an overvoltage generator event; and limiting the current to a predetermined maximum current value.

9. The method according to claim 8, further comprising limiting the current to a predetermined nominal current value in nominal operating mode.

10. An onboard electronic system comprising:

an electric power generator; and at least one electronic equipment item powered by said generator, comprising a protection device in accordance with claim 1 connected between said electric power generator and the at least one electronic equipment item.

\* \* \* \* \*